US011621022B2

(12) United States Patent
Zheng et al.

(10) Patent No.: US 11,621,022 B2
(45) Date of Patent: Apr. 4, 2023

(54) VIDEO FILE GENERATION METHOD AND DEVICE, TERMINAL AND STORAGE MEDIUM

(71) Applicant: BEIJING BYTEDANCE NETWORK TECHNOLOGY CO., LTD., Beijing (CN)

(72) Inventors: Wei Zheng, Beijing (CN); Yi Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/719,237

(22) Filed: Apr. 12, 2022

(65) Prior Publication Data

US 2022/0238139 A1 Jul. 28, 2022

Related U.S. Application Data

(63) Continuation of application No. PCT/CN2020/113987, filed on Sep. 8, 2020.

(30) Foreign Application Priority Data

Oct. 14, 2019 (CN) ......................... 201910975347.0

(51) Int. Cl.
*G11B 27/031* (2006.01)
*G06F 3/16* (2006.01)
*G06F 3/04847* (2022.01)

(52) U.S. Cl.
CPC ............ *G11B 27/031* (2013.01); *G06F 3/165* (2013.01); *G06F 3/04847* (2013.01)

(58) Field of Classification Search
CPC .... G11B 27/031; G06F 3/165; G06F 3/04847
See application file for complete search history.

(56) References Cited

U.S. PATENT DOCUMENTS

2009/0273712 A1 11/2009 Landy
2015/0139613 A1 5/2015 Mondelore et al.
2017/0064244 A1* 3/2017 Abou Mahmoud . H04N 5/7605

FOREIGN PATENT DOCUMENTS

CN 1862514 A 11/2006
CN 101640057 A 2/2010

(Continued)

OTHER PUBLICATIONS

International Patent Application No. PCT/CN2020/113987; Int'l Search Report; dated Dec. 1, 2020; 2 pages.

*Primary Examiner* — Mishawn N. Hunter
(74) *Attorney, Agent, or Firm* — BakerHostetler

(57) ABSTRACT

A method and an apparatus for generating a video file, a terminal and a storage medium are provided. The method includes: receiving an editing instruction for a video, and presenting at least one video template corresponding to the video; obtaining, in response to a selection instruction for a target video template, a resource set corresponding to the target video template; presenting an editing interface comprising an editing button if it is determined based on the video configuration parameter that the audio data is editable; editing, in response to a clicking operation on the editing button, the audio data to obtain edited audio data; adjusting, based on the edited audio data, a playback parameter of the image data; and performing, based on the edited audio data and the adjusted playback parameter, video file synthesis to obtain a target video file.

18 Claims, 15 Drawing Sheets

(56) References Cited

FOREIGN PATENT DOCUMENTS

| | | | |
|---|---|---|---|
| CN | 104349175 | A | 2/2015 |
| CN | 104540028 | A | 4/2015 |
| CN | 105262959 | A | 1/2016 |
| CN | 105530440 | A | 4/2016 |
| CN | 105550251 | A | 5/2016 |
| CN | 106303686 | A | 1/2017 |
| CN | 107357771 | A | 11/2017 |
| CN | 107743268 | A | 2/2018 |
| CN | 108419035 | A | 8/2018 |
| CN | 108882015 | A | 11/2018 |
| CN | 108924441 | A | 11/2018 |
| CN | 108965599 | A | 12/2018 |
| CN | 109769141 | A | 5/2019 |
| CN | 110033502 | A | 7/2019 |
| CN | 110276057 | A | 9/2019 |
| CN | 110288678 | A | 9/2019 |
| WO | WO 2016/001793 | A1 | 1/2016 |

* cited by examiner

VIDEO FILE GENERATION METHOD AND DEVICE, TERMINAL AND STORAGE MEDIUM

The present application is a continuation application of International Application No. PCT/CN2020/113987, titled "VIDEO FILE GENERATION METHOD AND DEVICE, TERMINAL AND STORAGE MEDIUM", filed on Sep. 8, 2020, which claims priority to Chinese Patent Application No. 201910975347.0, titled "VIDEO FILE GENERATION METHOD AND DEVICE, TERMINAL AND STORAGE MEDIUM", filed on Oct. 14, 2019, both of which are incorporated herein by reference in their entireties.

FIELD

The embodiments of the present disclosure relate to the field of computer technologies, and in particular to a method and an apparatus for generating a video file, a terminal, and a storage medium.

BACKGROUND

As photos and videos have become common methods for people to record their lives, videos formed by photos such as electronic photo albums and dynamic albums have been widely used on major social platforms. In the related technology, a video formed by photos such as a dynamic album is generally produced based on a fixed timeline and by a backend delivering a configured template to a resource for a user to use. However, the user is not allowed to change the template, for example, the user is not allowed to replace a background music in the templates, which limits operations by the user.

SUMMARY

In view of the above, a method and an apparatus for generating a video file, a terminal, and a storage medium are provided according to the embodiments of the present disclosure.

In a first aspect, a method for generating a video file is provided according to an embodiment of the present disclosure. The method includes:

receiving an editing instruction for a video, and presenting at least one video template corresponding to the video;

obtaining, in response to a selection instruction for a target video template, a resource set corresponding to the target video template, the resource set including audio data, image data, and a video configuration parameter;

presenting an editing interface including an editing button if it is determined based on the video configuration parameter that the audio data is editable;

editing, in response to a clicking operation on the editing button, the audio data to obtain edited audio data;

adjusting, based on the edited audio data, a playback parameter of the image data; and performing, based on the edited audio data and the adjusted playback parameter, video file synthesis to obtain a target video file.

In the above solution, the editing, in response to the clicking operation on the editing button, the audio data to obtain edited audio data includes:

presenting, in response to the clicking operation on the editing button, multiple audio icons on the editing interface;

obtaining, in response to a selection instruction for a target audio icon, target audio data corresponding to the target audio icon; and replacing the audio data in the resource set with the target audio data.

In the above solution, the replacing the audio data in the resource set with the target audio data includes:

obtaining a playback timeline of the audio data in the resource set, where the playback timeline indicates at least a start time instant and an end time instant of audio playback;

adjusting a playback timeline of the target audio data based on the playback timeline; and replacing the audio data in the resource set with the target audio data having the adjusted playback timeline.

In the above solution, the method further includes:

presenting, in response to a clicking operation on a presented cutting button, a sound spectrum line corresponding to the target audio data;

determining, in response to a dragging operation on the sound spectrum line, a playback start time instant and/or a playback end time instant of the target audio data; and cutting the target audio data based on the determined playback start time instant and/or the determined playback end time instant.

In the above solution, the editing, in response to the clicking operation on the editing button, the audio data to obtain the edited audio data includes:

presenting, in response to the clicking operation on the editing button, a volume adjustment axis for adjusting a playback volume of the audio data;

adjusting, in response to a dragging operation on an adjustment node in the volume adjustment axis, a volume of the audio data at a playback position; and replacing the audio data in the resource set with the audio data having the adjusted volume.

In the above solution, the adjusting, based on the edited audio data, the playback parameter of the image data includes:

obtaining an image presentation mode corresponding to the target video template; and adjusting, based on the image presentation mode and the edited audio data, at least one of following parameters of the image data: the number of images and a playback speed.

In the above solution, the performing, based on the edited audio data and the adjusted playback parameter, video file synthesis to obtain the target video file includes:

obtaining an image for forming the target video file based on the adjusted playback parameter;

obtaining an image presentation mode corresponding to the target video template; and performing, based on the edited audio data, the obtained image and the image presentation mode, video encoding to obtain the target video file.

In a second aspect, an apparatus for generating a video file is provided according to an embodiment of the present disclosure. The apparatus includes:

a first presentation unit configured to receive an editing instruction for a video, and present at least one video template corresponding to the video;

an obtaining unit configured to obtain, in response to a selection instruction for a target video template, a resource set corresponding to the target video template, the resource set including audio data, image data, and a video configuration parameter;

a second presentation unit configured to present an editing interface including an editing button if it is determined based on the video configuration parameter that the audio data is editable;

an edition unit configured to edit, in response to a clicking operation on the editing button, the audio data to obtain edited audio data;

an adjustment unit configured to adjust, based on the edited audio data, a playback parameter of the image data; and a synthesis unit configured to perform, based on the edited audio data and the adjusted playback parameter, video file synthesis to obtain a target video file.

In the above solution, the edition unit is further configured to present, in response to the clicking operation on the editing button, multiple audio icons on the editing interface;

obtain, in response to a selection instruction for a target audio icon, target audio data corresponding to the target audio icon; and replace the audio data in the resource set with the target audio data.

In the above solution, the edition unit is further configured to obtain a playback timeline of the audio data in the resource set, where the playback timeline indicates at least a start time instant and an end time instant of audio playback;

adjust a playback timeline of the target audio data based on the playback timeline; and replace the audio data in the resource set with the target audio data having the adjusted playback timeline.

In the above solution, the apparatus further includes a cutting unit configured to:

present, in response to a clicking operation on a presented cutting button, a sound spectrum line corresponding to the target audio data;

determine, in response to a dragging operation on the sound spectrum line, a playback start time instant and/or a playback end time instant of the target audio data; and cut the target audio data based on the determined playback start time instant and/or the determined playback end time instant.

In the above solution, the edition unit is further configured to present, in response to the clicking operation on the editing button, a volume adjustment axis for adjusting a playback volume of the audio data;

adjust, in response to a dragging operation on an adjustment node in the volume adjustment axis, a volume of the audio data at a playback position; and replace the audio data in the resource set with the audio data having the adjusted volume.

In the above solution, the adjustment unit is further configured to obtain an image presentation mode corresponding to the target video template; and adjust, based on the image presentation mode and the edited audio data, at least one of following parameters of the image data: the number of images and a playback speed.

In the above solution, the synthesis unit is further configured to obtain an image for forming the target video file based on the adjusted playback parameter;

obtain an image presentation mode corresponding to the target video template; and perform, based on the edited audio data, the obtained image and the image presentation mode, video encoding to obtain the target video file.

In a third aspect, a terminal is provided according to an embodiment of the present disclosure. The terminal includes:

a memory configured to store executable instructions; and a processor configured to implement the method for generating a video file according to the embodiments of the present disclosure when executing the executable instructions.

In a fourth aspect, a non-transitory storage medium storing executable instructions is provided according to an embodiment of the present disclosure. The executable instructions are configured to perform, when executed, the method for generating a video file according to the embodiments of the present disclosure.

The embodiments of the present disclosure have the following beneficial effects.

Audio data in a resource set corresponding to an editable target resource template is edited to obtained edited audio data, a playback parameter of image data in the resource set is adjusted based on the edited audio data, and video file synthesis is performed based on the edited audio data and the adjusted playback parameter to obtain the target video file. In this way, by changing or replacing the audio data, the timeline of the video file becomes flexible, so as to obtain a changeable resource template, thereby improving operability for the user.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

FIGS. 6A to 6G are schematic diagrams of editing interfaces according to embodiments of the present disclosure;

DESCRIPTION OF EMBODIMENTS

Figure 1:
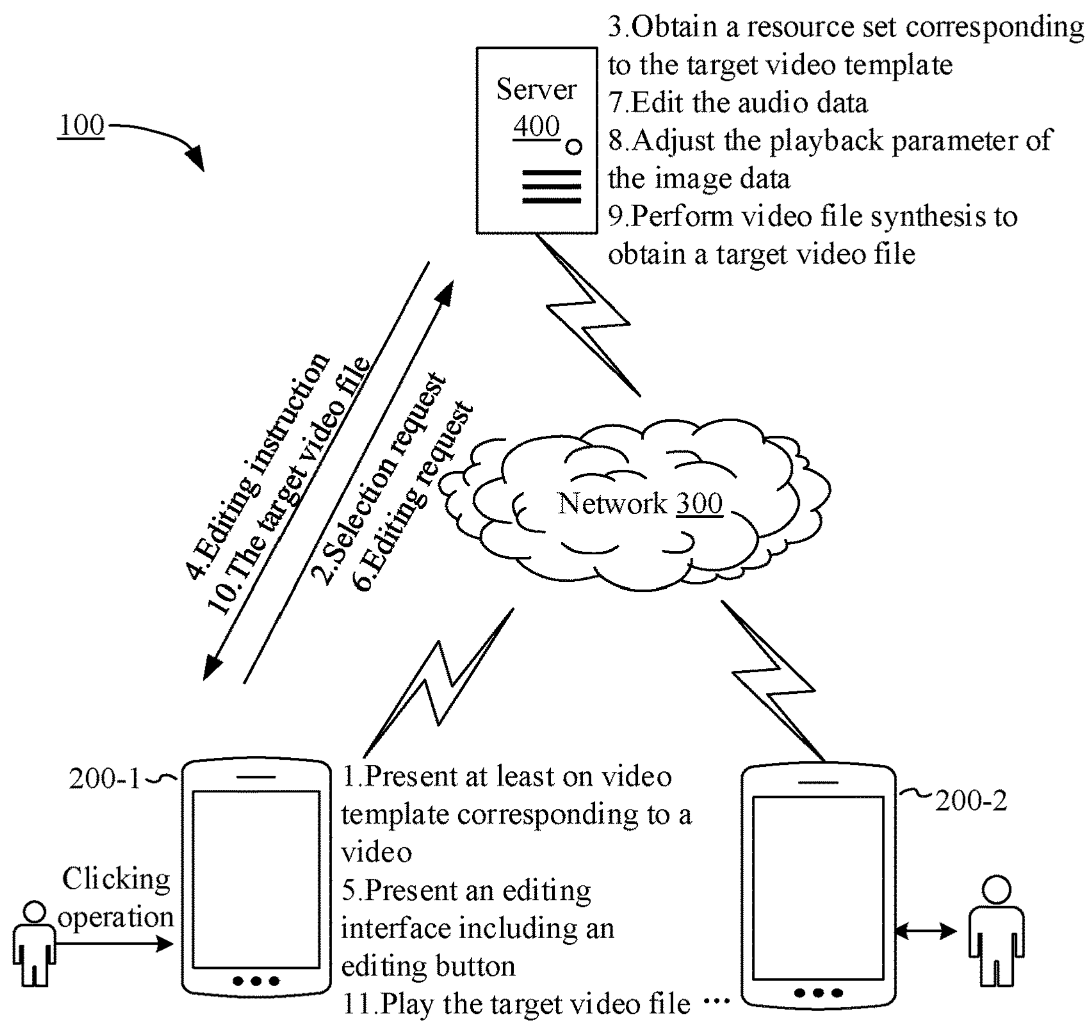
FIG. 1 is a schematic diagram showing architecture of a system for generating a video file according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, that is, "including but not limited to". The term "based on" means "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or a plurality of".

The names of messages or information exchanged between multiple devices in the embodiments of the present disclosure are only for illustrative purposes, and are not intended to limit the scope of these messages or information.

Exemplary applications of the apparatus implementing the embodiments of the present disclosure are described below. The apparatus according to the embodiments of the present disclosure may be implemented as various types of user terminals such as a smart phone, a tablet computer, and a notebook computer, and may alternatively be implemented by a terminal in cooperation with a server. In the following, exemplary applications of the apparatus will be explained.

In some embodiments, a terminal alone performs operation. The terminal is configured to receive an editing instruction for a video, and present at least one video template corresponding to the video; obtain, in response to a selection instruction for a target video template, a resource set corresponding to the target video template, the resource set including audio data, image data, and a video configuration parameter; present an editing interface including an editing button if it is determined based on the video configuration parameter that the audio data is editable; edit, in response to a clicking operation on the editing button, the audio data to obtain edited audio data; adjust, based on the edited audio data, a playback parameter of the image data; and performing, based on the edited audio data and the adjusted playback parameter, video file synthesis to obtain a target video file. In this way, the editing of the audio data, adjustment of the playback parameter of the image data and video file synthesis are performed on the terminal side in real time, which improves the efficiency of obtaining audio data for replacement, and improves user experiences.

In some embodiments, the terminal and the server cooperate with each other. Referring to FIG. 1, which is a schematic diagram showing architecture of a system 100 for generating a video file according to an embodiment of the present disclosure. In order to support an exemplary application, a terminal 200 (including a terminal 200-1 and a terminal 200-2), and a terminal 400 are connected to a server 400 through a network 300. The network 300 may be a wide area network or a local area network, or a combination of the two, which uses a wireless link to implement data transmission.

The terminal 200 is configured to receive an editing instruction for a video and present at least one video template corresponding to the video; and generate and send, in response to a selection instruction for a target video template, a selection request for the target video template to the slave server 400.

The server 400 is configured to obtain, in response to the selection request, a resource set corresponding to the target video template, where the resource set includes: audio data, image data, and a video configuration parameter; and send, if it is determined based on the video configuration parameter that the audio data is editable, a corresponding editing command to the terminal 200.

The terminal 200 presents an editing interface including an editing button; and send, in response to a clicking operation on the editing button, an editing request to the server 400.

The server 400 is configured to edit the audio data to obtain edited audio data; adjust, based on the edited audio data, a playback parameter of the image data; perform, based on the edited audio data and the adjusted playback parameter, video file synthesis to obtain a target video file; and send the obtained target video file to the terminal 200, so that the terminal 200 plays the received target video file. In this way, editing of the audio data, adjustment of the playback parameter of the image data and video file synthesis are performed by the server, reducing the data processing load on the terminal side, which is suitable for the case that the computing amount of changing the audio data of the target video template is great.

Figure 2:
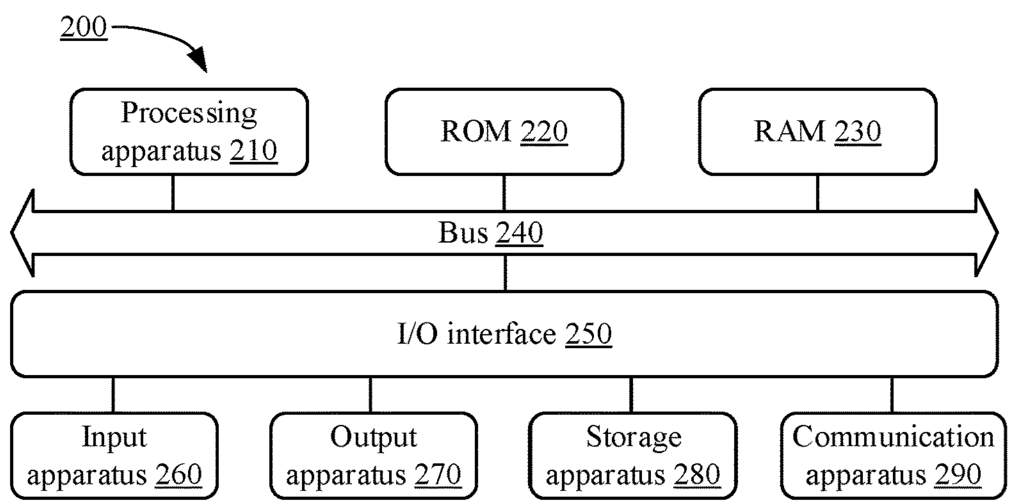
FIG. 2 is a schematic structural diagram of a terminal according to an embodiment of the present disclosure.

Reference is made to FIG. 2, which shows a schematic structural diagram of a terminal 200 according to an embodiment of the present disclosure. The terminal may include a mobile terminal such as a mobile phone, a laptop computer, a digital broadcast receiver, a personal digital assistant (PDA), a tablet (PAD), a portable multimedia player (PMP), a vehicle-mounted terminal (such as an in-vehicle navigation terminal), and the like, and a fixed terminal such as a digital TV, a desktop computer, and the like. The terminal shown in FIG. 2 is only exemplary, and should not indicate any limitation to the function and scope of application of the embodiments of the present disclosure.

As shown in FIG. 2, the terminal 200 may include a processing apparatus 210, such as a central processing unit or a graphics processor, which can execute various appropriate actions and processes based on a program stored in a Read Only Memory (ROM) 220 or a program loaded from a storage apparatus 280 into a Random Access Memory (RAM) 230. In the RAM 230, various programs and data required by the terminal for operation are further stored. The processing apparatus 210, the ROM 220, and the RAM 230 are connected to each other through a bus 240. An input/output (I/O) interface 250 is also connected to the bus 240.

Generally, the following may be connected to the I/O interface 250: an input apparatus 260 such as a touch screen, a touch pad, a keyboard, a mouse, a camera, a microphone, an accelerometer, a gyroscope, an output apparatus 270 such as a Liquid Crystal Display (LCD), a speaker, a vibrator, a storage apparatus 280 such as a magnetic tape, a hard disk, and a communication apparatus 290. Based on the communication apparatus 290, the terminal may communicate with other devices through wired or wireless communication to exchange data. Although FIG. 2 shows the terminal including various apparatuses, it should be understood that not all shown apparatuses are required to be implemented or included. The shown apparatuses may be replaced by other apparatuses, or more or less apparatuses may be included.

In particular, the processes described with reference to flow charts, may be implemented as a computer software program according to an embodiment of the present disclosure. For example, a computer program product is provided according to an embodiment of the present disclosure, the computer program product includes a computer program embodied on a computer readable medium. The computer program includes program codes for performing the method shown in the flowchart. In such embodiments, the computer program may be downloaded and installed from the network through the communication apparatus 290, installed from the storage apparatus 280, or installed from the ROM 220. The computer program, when being executed by the processing apparatus 210, performs functions defined in the method for generating a video file according to the embodiments of the present disclosure.

It should be noted that the computer readable medium according to the embodiments of the present disclosure may be a computer readable signal medium or a computer readable storage medium or any combination of the two. The computer readable storage medium may include, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a RAM, a ROM, an Erasable Programmable Read Only Memory (EPROM), a flash memory, an optical fiber, a portable Compact Disk Read-Only Memory (CD-ROM), an optical storage device, a magnetic storage device, or any suitable combination of the foregoing.

In the present disclosure, the computer readable storage medium may be any tangible medium containing or storing a program, where the program may be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium may send, transmit or transfer programs used by an instruction execution system, apparatus or device or used in combination therewith. The program codes included in the computer readable medium may be transferred through any proper medium including an electric wire, an optical cable, Radio Frequency (RF), and the like, or any suitable combination of the foregoing.

The computer readable medium may be included in the terminal 200. Alternatively, the computer readable medium may exist independently and not assembled in the terminal 200.

The computer readable medium may carry one or more programs. The terminal 200, when executing the one or more programs, performs the method for generating a video file according to the embodiments of the present disclosure.

The computer program codes for performing the operations according to the embodiments of the present disclosure may be written in at least one programming language or a combination of the at least one programming language. The programming language includes an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

Units and/or modules involved in the embodiments of the present disclosure may be implemented by software or by hardware.

In terms of hardware, the units and/or modules of the terminal implementing the embodiments of the present disclosure may be implemented by one or more Application Specific Integrated Circuits (ASICs), DSPs, Programmable Logic Devices (PLDs), Complex Programmable Logic Devices (CPLDs), Field-Programmable Gate Arrays (FPGAs), or other electronic components, for implementing the method for generating a video file according to the embodiments of the present disclosure.

Figure 3:
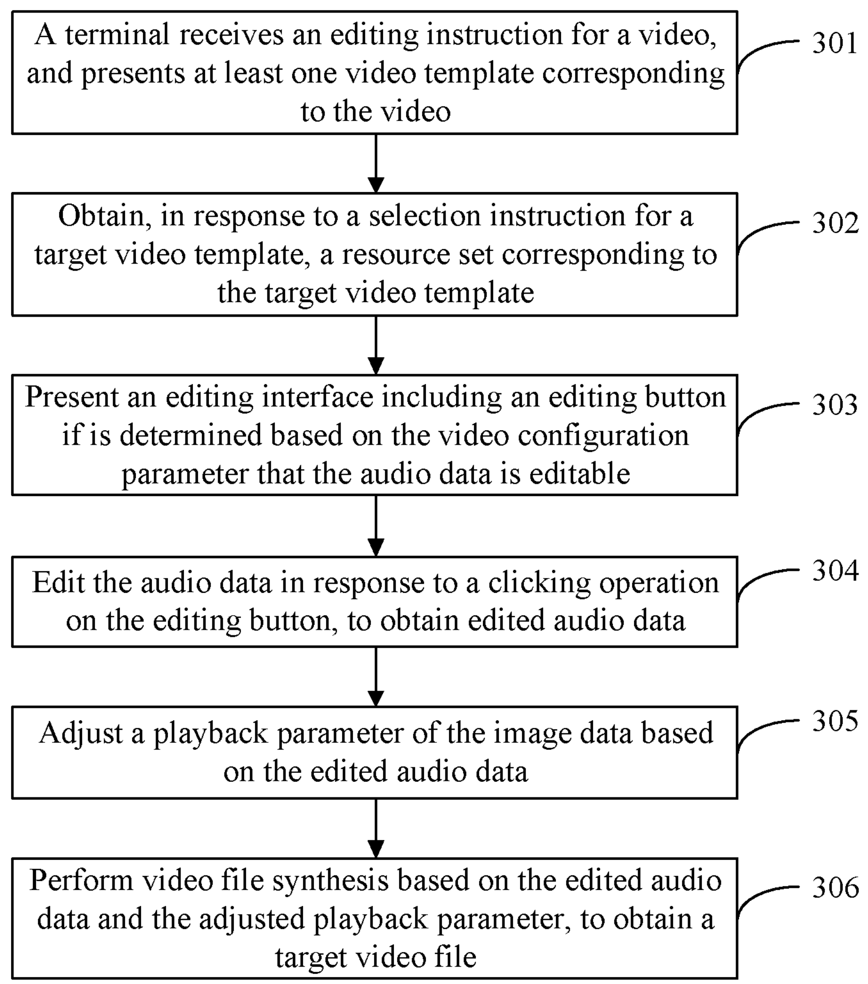
FIG. 3 is a flowchart of a method for generating a video file according to an embodiment of the present disclosure.

Referring to FIG. 3, FIG. 3 is a flowchart of a method for generating a video file according to an embodiment of the present disclosure. The method for generating a video file according to an embodiment of the present disclosure includes the following steps 301 to 306.

In step 301, a terminal receives an editing instruction for video, and presents at least one video template corresponding to the video.

In practice, the terminal is provided with a client, such as an instant messaging client, a microblog client, a short video client, and the like, and a user performs social interaction by loading a prop resource on the client, where the prop resource include at least one of: a video prop, an audio prop, a user interface (UI) animation prop. The video prop may include, for example, a video template, a video cover, and text associated with the video, such as a title, a video tag, and the like. The audio prop may be background music, and the UI animation may be an interface for network interaction.

In actual implementation, the user may click an editing button for the video on the client to trigger a corresponding editing instruction to the terminal; and on reception of the editing instruction triggered by the user, the terminal correspondingly presents multiple video templates corresponding to the video.

Figure 4A:
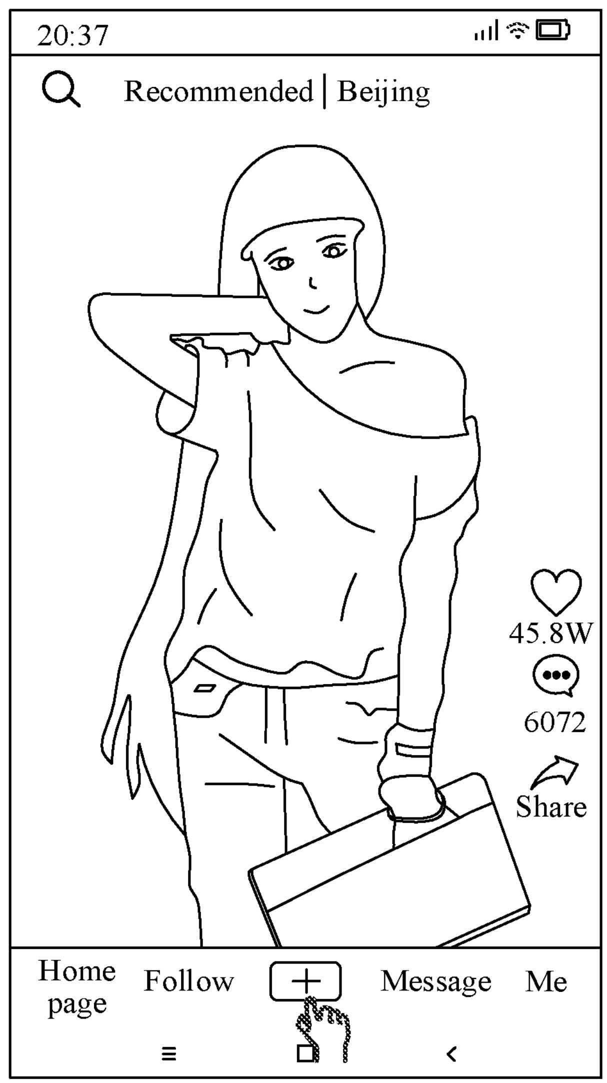
FIGS. 4A to 4C are schematic diagrams of an editing interface according to an embodiment of the present disclosure.
Figure 4B:
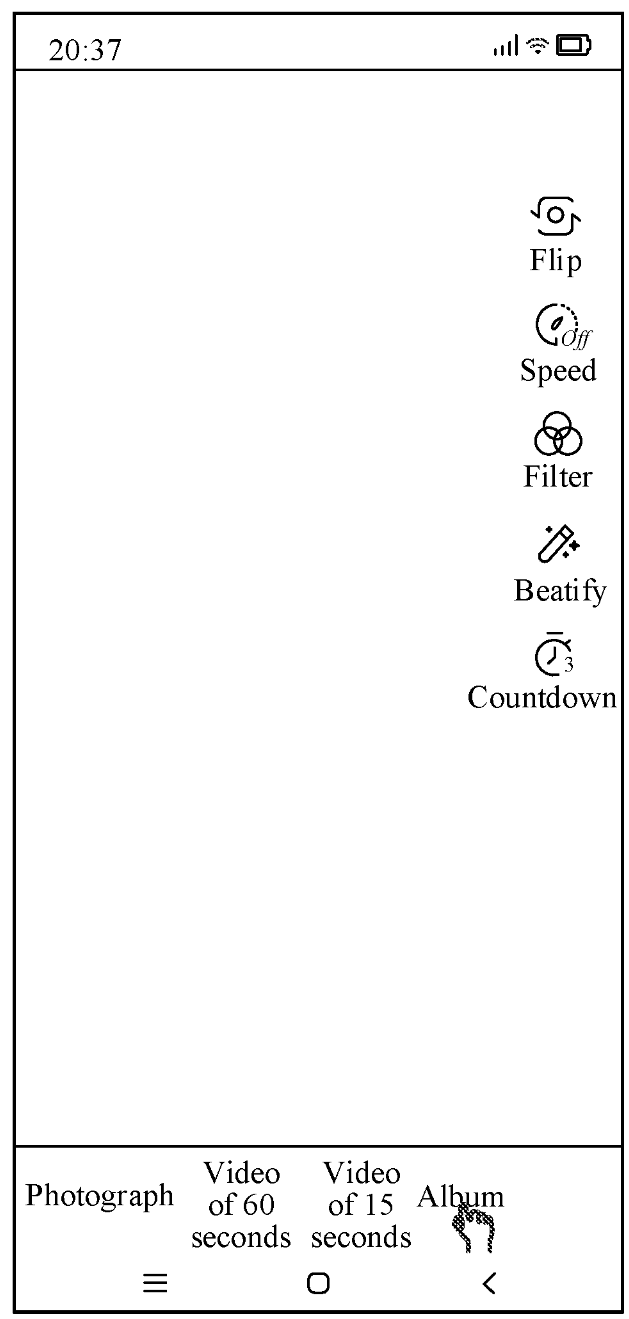
Figure 4C:
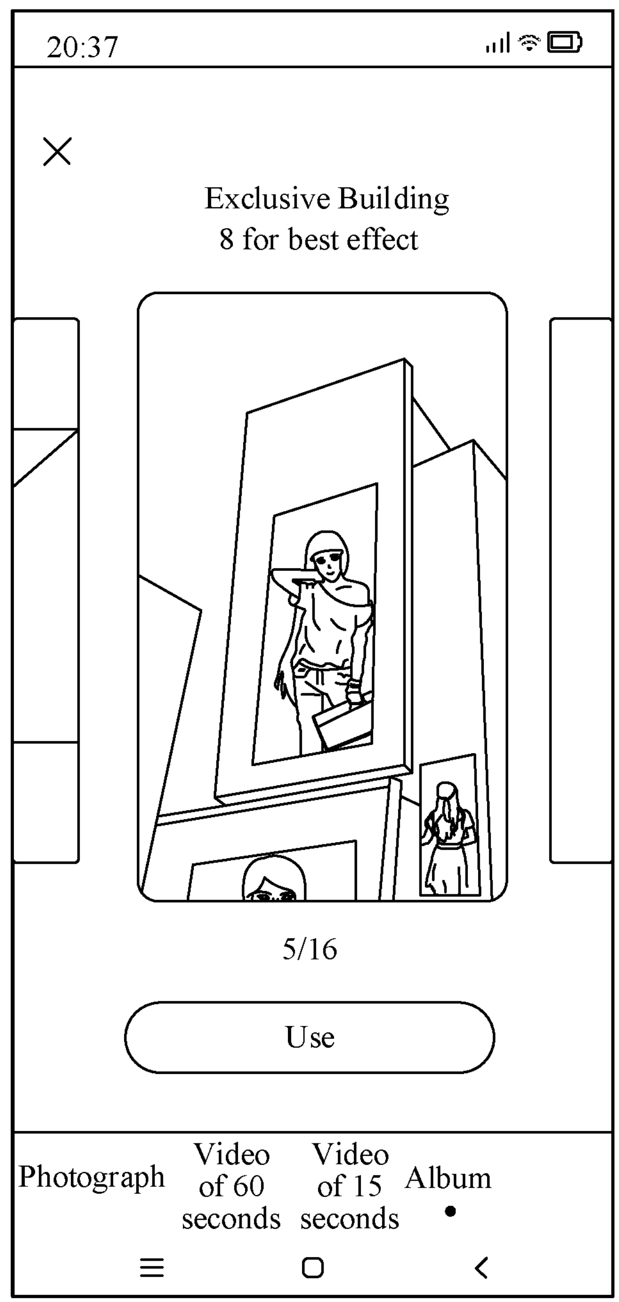

For example, referring to FIGS. 4A to 4C, which are schematic diagrams of an editing interface according to an embodiment of the present disclosure. When the user opens the short video client provided on the terminal, the interface shown in FIG. 4A is presented on the short video client. When the user clicks the editing button "+" in FIG. 4A, the interface shown in FIG. 4B is presented on the short video client. When the user clicks the "Album" button in FIG. 4B, the corresponding editing instruction is triggered, and the short video client receives this editing instruction and presents 16 video templates such as "Retro Magazine", "Full Moon Mid-Autumn Festival", and "Exclusive Building" as shown in FIG. 4C.

In step 302, in response to a selection instruction for a target video template, a resource set corresponding to the target video template is obtained. The resource set includes audio data, image data, and a video configuration parameter.

In practice, based on the selection of the target video template by the user, the terminal presents the corresponding target video template, and obtains the resource set corresponding to the target video template.

For example, when the user selects "Exclusive Building" from among the multiple video templates on the editing interface shown in FIG. 4C as the target video template, and clicks a "Use" button corresponding to the target video template "Exclusive Building", the terminal receives a selection instruction triggered based on the touch operation by the user on the selection button corresponding to the target video template "Exclusive Building", and loads a resource set corresponding to the target video template "Exclusive Building".

In step 303, if is determined based on the video configuration parameter that the audio data is editable, an editing interface including an editing button is presented.

Figure 5:
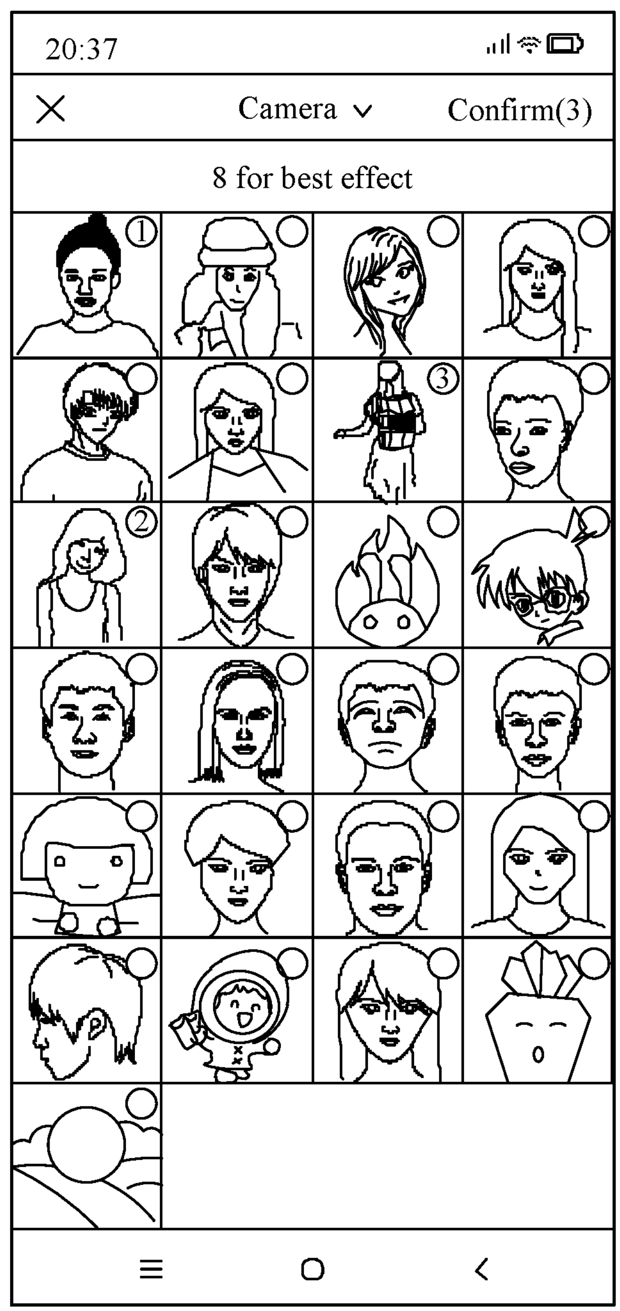
FIG. 5 is a schematic diagram of an interface for importing a custom image according to an embodiment of the present disclosure.

Here, in practice, after the user determines the target video template, a user-defined preset number of images may be imported into the target video template, so that the preset number of images present an effect as in the target video template. For example, Referring to FIG. 5, which is a schematic diagram of an interface for importing a custom image according to an embodiment of the present disclosure, when the target video template selected by the user is "exclusive building", and the target video template of "Exclusive Building", and the target video template "Exclusive Building" shows a best presentation effect for 8 images, the user may import up to 8 images into the target video template "Exclusive Building".

In practice, the video template is matched by the backend based on a motion vector (MV) algorithm, and the video configuration parameter corresponding to the video template has an identifier indicating whether a timeline of the audio data is dynamically changeable. If the identifier indicates that the timeline of the audio data is changeable, that is, if it is determined that the audio data is editable, a corresponding editing interface including an editing buttons is presented on the terminal.

Figure 6A:
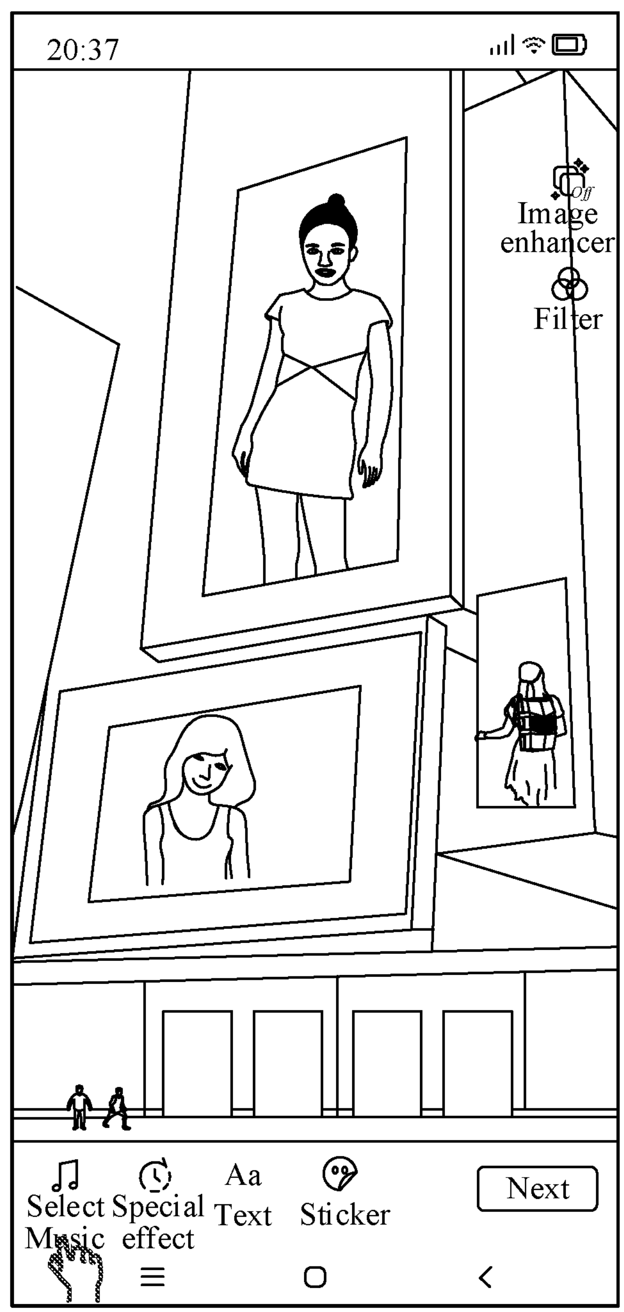

Referring to FIG. 6A, which is a schematic diagram of an editing interface according to an embodiment of the present disclosure, multiple editing buttons are displayed on the editing interface, such as Audio Selection, Special Effect, Text, Sticker, and the like. Clicking on different buttons triggers different editing manners.

In step 304, the audio data is edited in response to a clicking operation on the editing button, to obtain edited audio data.

In some embodiments, the terminal may edit the audio data in the following manner to obtain the edited audio data:

presenting, in response to the clicking operation on the editing button, multiple audio icons on the editing interface; obtaining, in response to a selection instruction for a target audio icon, target audio data corresponding to the target audio icon; and replacing the audio data in the resource set with the target audio data.

In actual implementation, when the editing button instructs to replace the audio data in the resource set of the target video template, multiple corresponding audio icons for replacement are presented on the editing interface on the terminal. When the user selects one of the multiple audio icons, the audio data in the resource set is replaced with the target audio data corresponding to the icon, so as to play the target audio data.

Figure 6B:
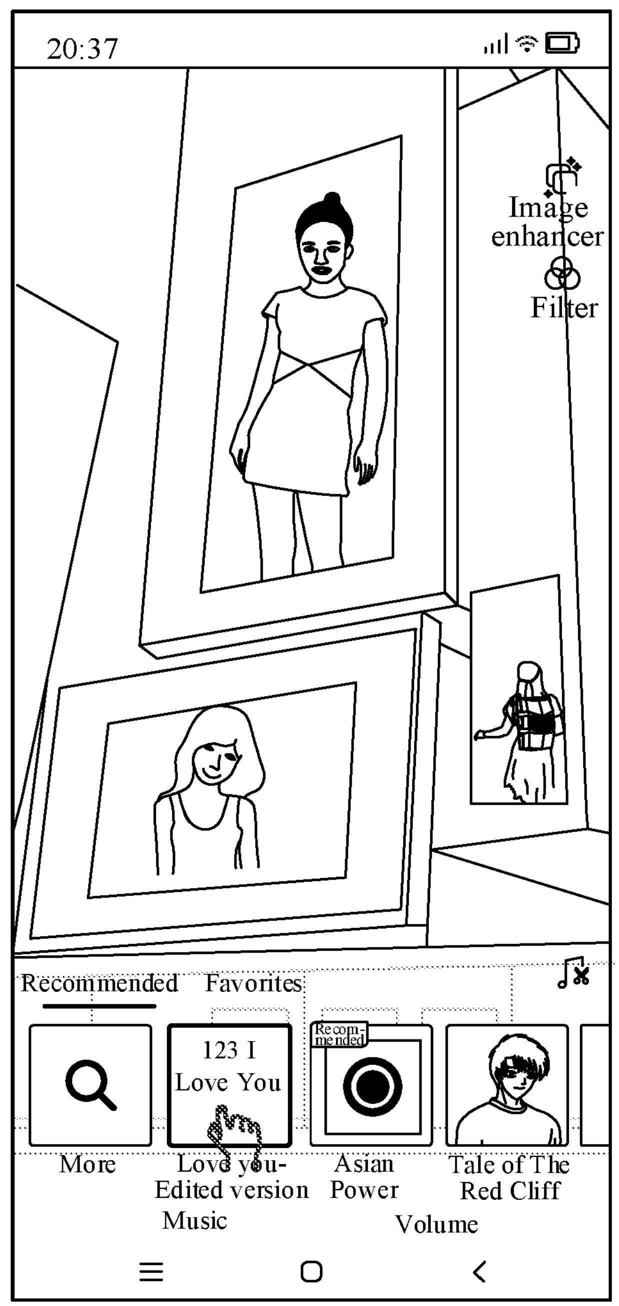

For example, when the user clicks the "Select Music" button as shown in FIG. 6A, referring to FIG. 6B, which is a schematic diagram of an editing interface according to an embodiment of the present disclosure, two columns of audio data options "Recommended" and "Favorites" for replacement are displayed on the editing interface on the terminal. In the "Recommended" options, multiple audio icons such as "123 I Love You", "Asian Power", "Tale of The Red Cliff" and "Search" for more music are presented. When the terminal receives a selection instruction triggered by a clicking operation by the user on the audio icon corresponding to the audio data of "123 I love you", the target audio data "123 I love you" is obtained, and the audio data in the resource set of the target video template is replaced with the target audio data "123 I love you", so as to play the song "123 I love you". In this way, based on the selection by the user, the background music in the resource template is replaced, which satisfies individual requirements of the user.

In practice, a duration of the target audio data selected by the user may be different from a duration of the audio data in the resource set of the target resource template, and the user does not cut the duration of the target audio data. In some embodiments, to adapt the user-selected target audio data to the target video template, the terminal may replace the audio data in the resource set with the target audio data by:

obtaining a playback timeline of the audio data in the resource set, where the playback timeline indicates at least a start time instant and an end time instant of audio playback; adjusting a playback timeline of the target audio data based on the playback timeline; and replace the audio data in the resource set with the target audio data having the adjusted playback timeline.

Here, the playback timeline of the audio data in the resource set indicates the start time instant and the end time instant of the audio data being played in the target resource template. For example, for a certain target resource template, the playback timeline of the audio data in the resource set indicates: starting playing from the 10th second of the audio data and ending playing at the 30th second of the audio data. When the audio data in the resource set is replaced with the target audio data, playback of the target video data is stated from the 10th second and ended at the 30th second. In this way, the prelude part of the audio data can be eliminated, and the climax part can be played directly to achieve a better playback effect.

In some embodiments, for the case where the duration of the target audio data is different from the duration of the audio data in the resource set, the user may cut the duration of the target audio data in a targeted manner. Correspondingly, the terminal may cut the audio data by:

presenting, in response to a clicking operation on a presented cutting button, a sound spectrum line corresponding to the target audio data; determining, in response to a dragging operation on the sound spectrum line, a playback start time instant and/or a playback end time instant of the target audio data; and cutting the target audio data based on the determined playback start time instant and/or the determined playback end time instant.

Figure 6C:
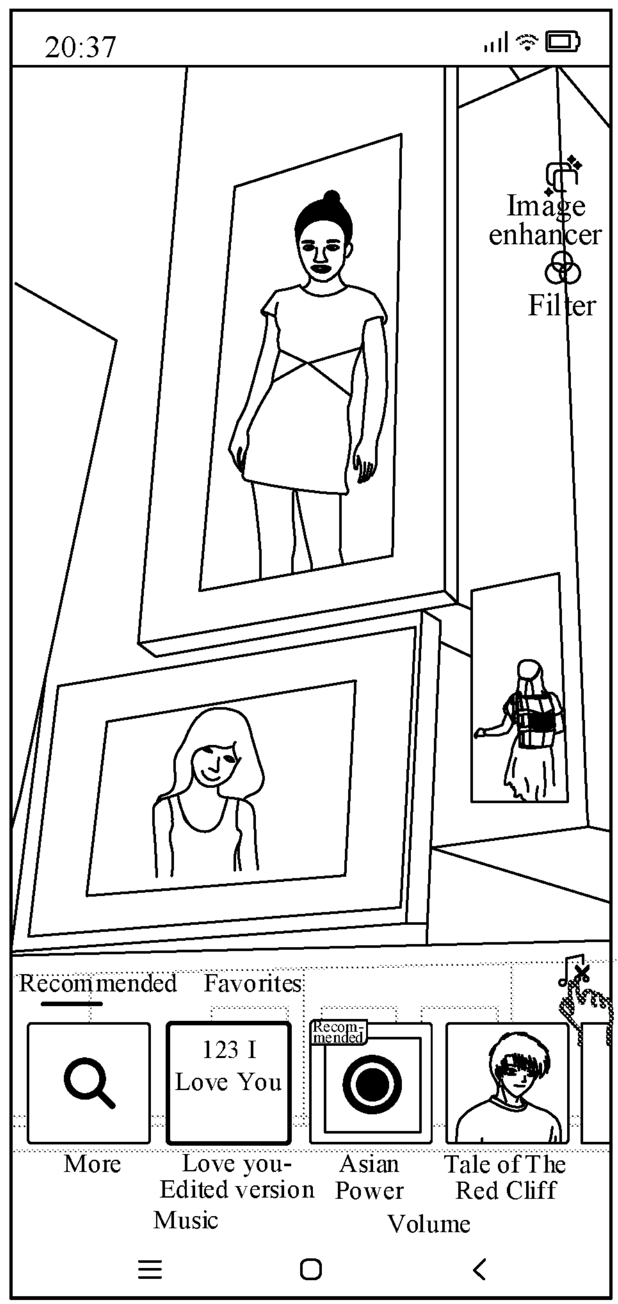
Figure 6D:
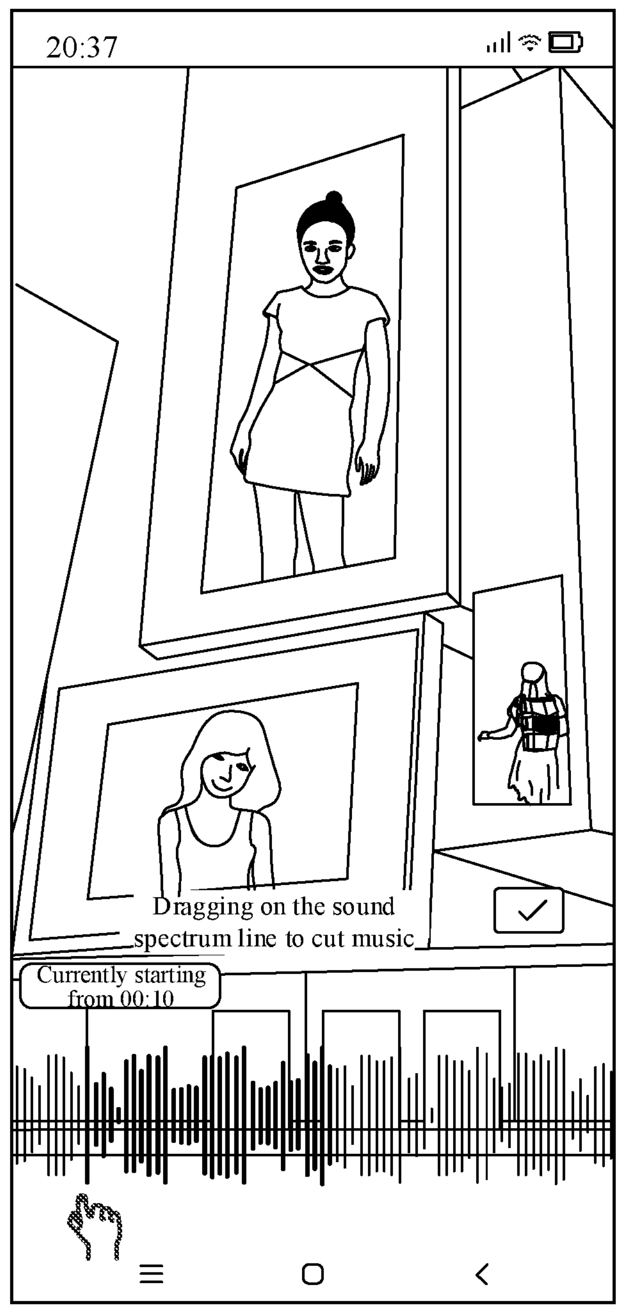

In actual implementation, the terminal may determine the playback start time instant of the target audio data based on a cutting instruction triggered by the dragging operation by the user on the sound spectrum line of the target audio data, and determine a timeline of the target audio data based on the duration of the audio data in the resource set. An example is shown in FIGS. 6C to 6D, which are schematic diagrams of an editing interface according to an embodiment of the present disclosure. In FIG. 6C, the user clicks the cutting button, and the sound spectrum line as shown in FIG. 6D is presented on the editing interface of the terminal. The user performs dragging on the sound spectrum line of the target audio data to the 10th second. Assuming that the duration of the audio data in the resource set is 20 seconds, the target audio data is to be played starting from the 10th second and ending at the 30th second, so as to play or circularly play the target audio data between the 10th and 30th seconds.

Figure 6E:
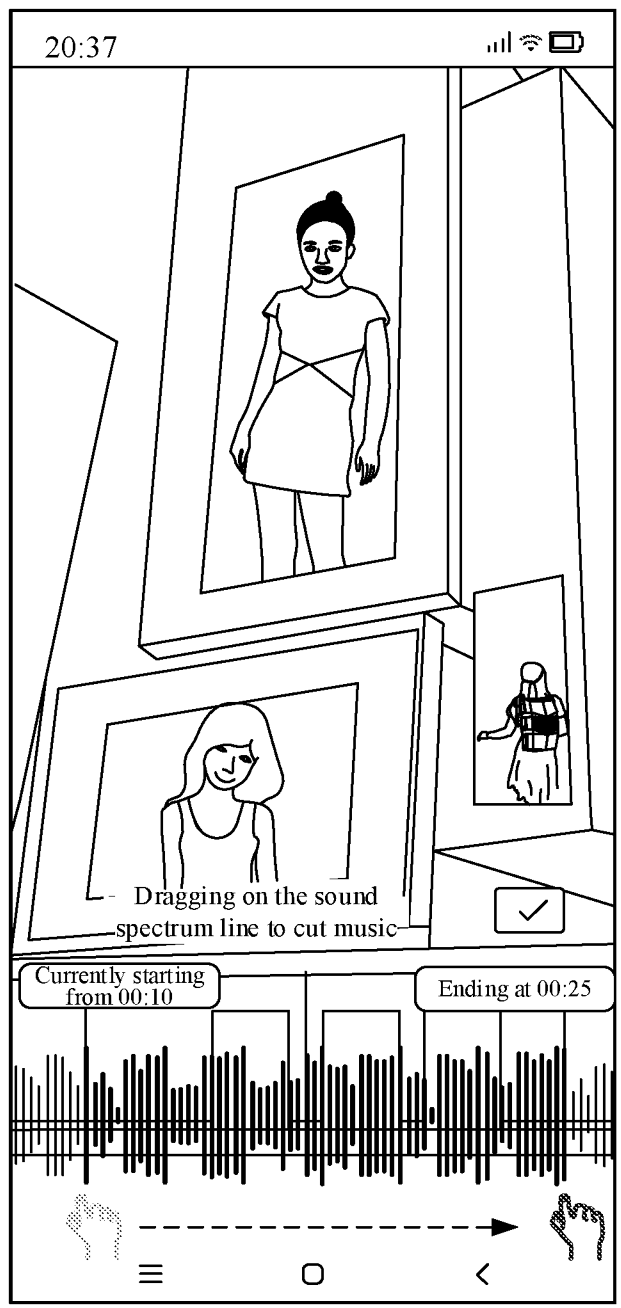

In practice, the terminal may determine the playback start time instant and the playback end time instant of the target audio data based on the cutting instruction triggered by the dragging operation by the user on the sound spectrum line of the target audio data, and perform cutting to obtain audio data between the playback start time instant and the playback end time instant. An example is shown in FIG. 6E, which is a schematic diagram of an editing interface according to an embodiment of the present disclosure. In FIG. 6E, the user perform dragging from the 10th second to the 25th second on the sound spectrum line of the target audio data, to perform cutting to obtain the target audio data between the 10th and 25th seconds, to play the target audio data obtained by cutting. In this way, the replacing of the audio data in the target resource template and customized cutting of the playback duration are implemented, thereby meeting individual requirements of users.

In some embodiments, the terminal may further edit the audio data in the following manner to obtain the edited audio data:

presenting, in response to the clicking operation on the editing button, a volume adjustment axis for adjusting a playback volume of the audio data; adjusting, in response to a dragging operation on an adjustment node in the volume adjustment axis, a volume of the audio data at a playback position; and replacing the audio data in the resource set with the audio data having the adjusted volume.

Figure 6F:
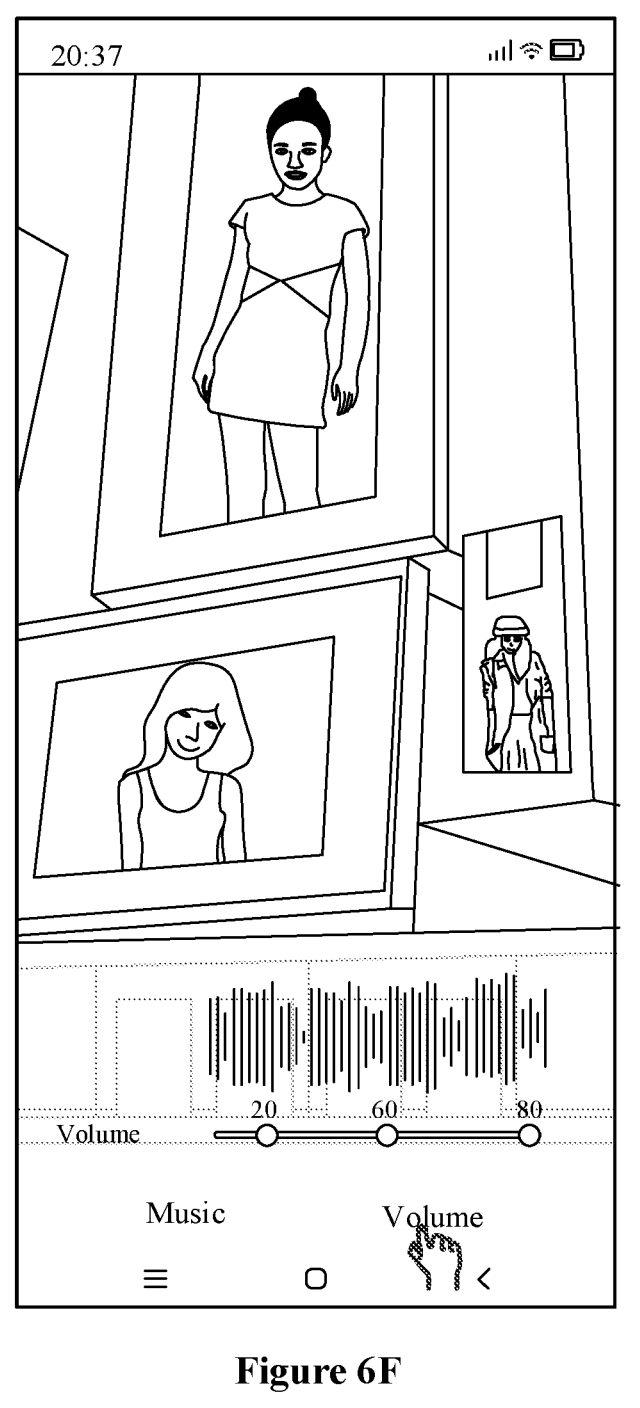

In actual implementation, when it is instructed through the editing button to adjust the playback volume of the audio data in the resource set, the volume adjustment axis for adjusting the playback volume of the audio data is presented on the editing interface on the terminal. The terminal adjusts volumes of the audio data at different playback positions based on the dragging operation on the adjustment node in the volume adjustment axis. Reference is made to FIG. 6F, which is a schematic diagram of an editing interface according to an embodiment of the present disclosure. The audio data is divided into three segments based on playback positions. A first segment of the audio data is played at a volume of 20 decibels, a second segment of the audio data is played at a volume of 60 decibels, and the third segment of the audio data is played at a volume of 80 decibels. In this way, based on user requirements, different segments of the audio data are played at different volumes, providing the user with a new listening experience.

Figure 6G:
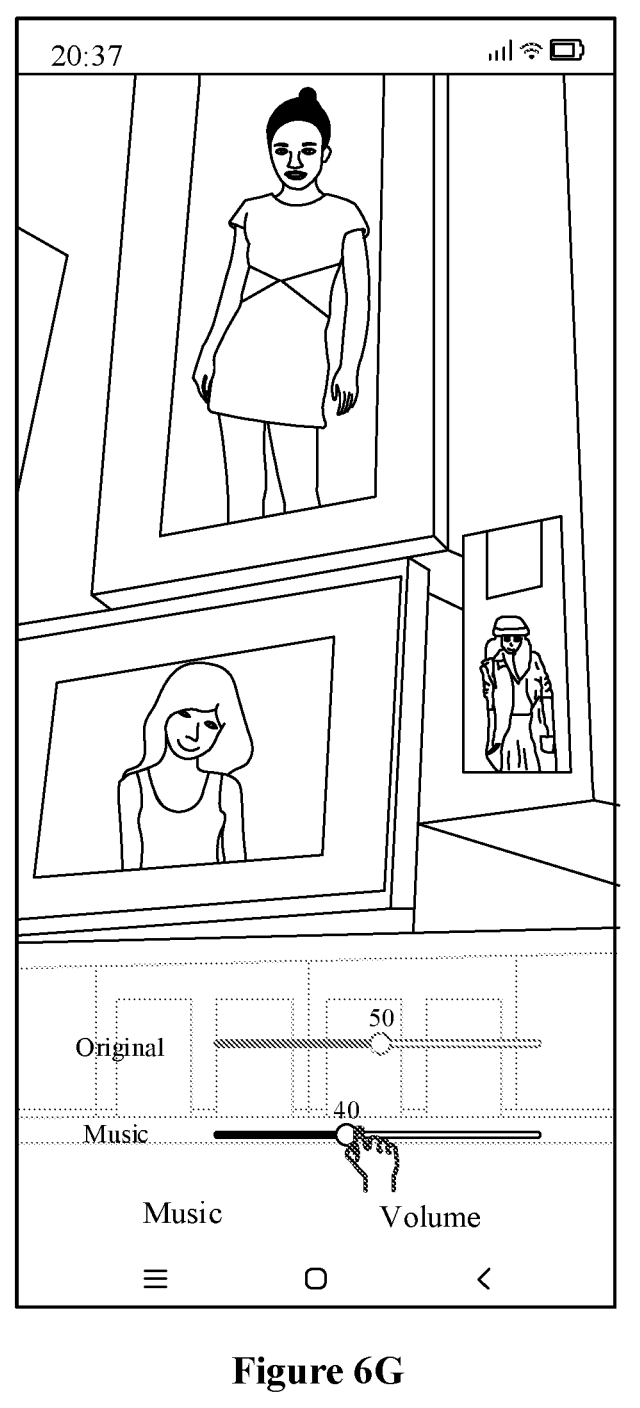

In some embodiments, the volume of the target audio data for replacement may also be adjusted. The terminal adjusts the playback volume of the target audio data based on a volume adjustment instruction triggered by the user dragging the adjustment node in the volume adjustment axis. Referring to FIG. 6G, which is a schematic diagram of an editing interface according to an embodiment of the present disclosure, the playback volume of the audio data in the resource set is 50 decibels, and by dragging the adjustment node in the volume adjustment axis of the target audio data (that is, Select Music), the volume of the target audio data is adjusted to 40 decibels. The terminal obtains the target audio data having the adjusted volume, and replaces the audio data in the resource set with the target audio data having the adjusted volume.

In step 305, a playback parameter of the image data is adjusted based on the edited audio data.

In some embodiments, the terminal may adjust the playback parameter of the image data by:

obtaining an image presentation mode corresponding to the target video template; and adjusting, based on the image presentation mode and the edited audio data, at least one of following parameters of the image data: the number of images and a playback speed.

In actual implementation, when configuring the target video template, the backend further sets a configuration parameter of the resource set, such as the image presentation mode which includes the number of images that presents the best effect, the switching speed of the background and the presentation manner (such as entry from the left or rotation entry, and the like). When editing the audio data in the resource set, in order to adapt the edited audio data to the target video template, the terminal further adjusts a parameter such as the number of images or the playback speed according to the edited audio data.

For example, the duration of the audio data in the target video template is 20 seconds, and the best effect may be achieved when 8 photos are imported. Assuming that after the audio data is edited, the duration of the audio data is cut to 15 seconds, the number of the imported images may be reduced or the playback speed may be increased to achieve a better playback effect.

In step 306, video file synthesis is performed based on the edited audio data and the adjusted playback parameter, to obtain a target video file.

In some embodiments, the terminal may obtain the target video file by:

obtaining an image for forming the target video file based on the adjusted playback parameter; obtaining an image presentation mode corresponding to the target video template; and performing, based on the edited audio data, the obtained image and the image presentation mode, video encoding to obtain the target video file.

By editing the editable audio data in the resource set of the target resource template, the edited audio data is obtained. The playback parameter of the image data in the resource set is adjusted based on the edited audio data. Video file synthesis is performed based on the edited audio data and the adjusted playback parameter, to obtain the target video file. In this way, by changing or replacing the audio data, the resource template is changed, thereby improving operability for the user and satisfying individual requirements of the user.

Figure 7:
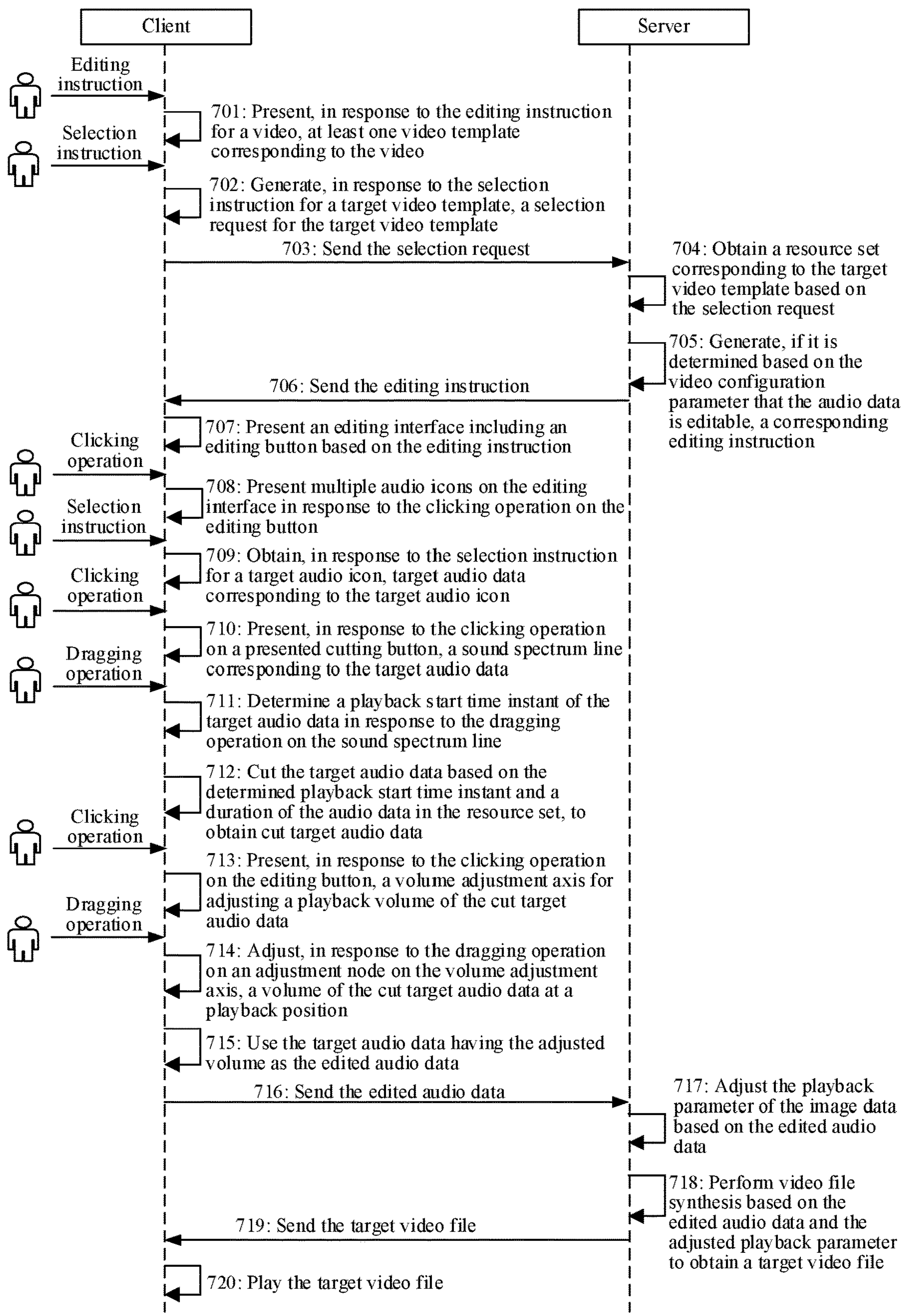
FIG. 7 is a flowchart of a method for generating a video file according to an embodiment of the present disclosure.

Referring to FIG. 7, which is a flowchart of a method for generating a video file according to an embodiment of the present disclosure. The method for generating a video file may be implemented by a client on a terminal in cooperation with a server. The method for generating a video file according to an embodiment of the present disclosure includes the following steps 701 to 720.

In step 701, the client presents, in response to an editing instruction for a video, at least one video template corresponding to the video.

In practice, the terminal is provided with a client, such as an instant messaging client, a microblog client, a short video client, and the like, and a user performs social interaction by loading a prop resource on the client. In actual implementation, the user may click an editing button for the video on the client to trigger a corresponding editing instruction to the terminal; and on reception of the editing instruction triggered by the user, the terminal correspondingly presents multiple video templates corresponding to the video.

In step 702, the client generates, in response to a selection instruction for a target video template, a selection request for the target video template.

Here, the client receives the selection instruction triggered by a touch operation by a user on a selection button for the target video template, and generates a corresponding selection request.

In step 703, the client sends the generated selection request for the target video template to the server.

In step 704, the server obtains a resource set corresponding to the target video template based on the selection request.

Here, the resource set includes: audio data, image data, and a video configuration parameter.

In step 705, in a case that the server determines that the audio data is editable based on the video configuration parameter, the server generates a corresponding editing instruction.

Here, in practice, the video template is matched by the server based on an MV algorithm, and the video configuration parameter corresponding to the video template has an identifier indicating whether the timeline of the audio data is dynamically changeable. If the identifier indicates that the timeline of the audio data is changeable, that is, if it is determined that the audio data is editable, the server generates the corresponding editing instruction.

In step 706, the server sends the corresponding editing instruction to the client.

In step 707, the client presents an editing interface including an editing button based on the editing instruction.

Here, the client presents the corresponding editing interface based on the editing instruction sent by the server.

In step 708, the client presents multiple audio icons on the editing interface in response to a clicking operation on the editing button.

In step 709, the client obtains, in response to a selection instruction for a target audio icon, target audio data corresponding to the target audio icon.

In step 710, the client presents, in response to a clicking operation on a presented cutting button, a sound spectrum line corresponding to the target audio data.

In step 711, the client determines a playback start time instant of the target audio data in response to a dragging operation on the sound spectrum line.

In step 712, the client cuts the target audio data based on the determined playback start time instant and a duration of the audio data in the resource set, to obtain cut target audio data.

Through the above steps, the target audio data is obtained for replacing the audio data in the target resource template, and the target audio data is cut.

In step 713, the client presents, in response to a clicking operation on the editing button, a volume adjustment axis for adjusting a playback volume of the cut target audio data.

Here, the volume of the target audio data obtained after cutting is adjusted.

In step 714, the client adjusts, in response to a dragging operation on an adjustment node on the volume adjustment axis, a volume of the cut target audio data at a playback position.

Here, based on requirements of the user, volumes of different segments of the cut target audio data are adjusted so as to play different segments of the target audio data with different volumes.

In step 715, the client uses the target audio data having the adjusted volume as the edited audio data.

The above steps are performed for replacing the audio data in the target video template, and the timeline and the volume of the target audio data for replacement are adjusted to obtain edited audio data, and the audio data in the resource set is replaced with the edited audio data.

In step 716, the client sends the edited audio data to the server.

In step 717, the server adjusts the playback parameter of the image data based on the edited audio data.

Here, the server obtains an image presentation mode corresponding to the target video template; and adjusts, based on the image presentation mode and the edited audio data, at least one of the following parameters of the image data: the number of images and a playback speed.

In step 718, the server performs video file synthesis based on the edited audio data and the adjusted playback parameter to obtain a target video file.

In step 719, the server sends the target video file to the client.

In step 720, the client plays the target video file.

Figure 8:
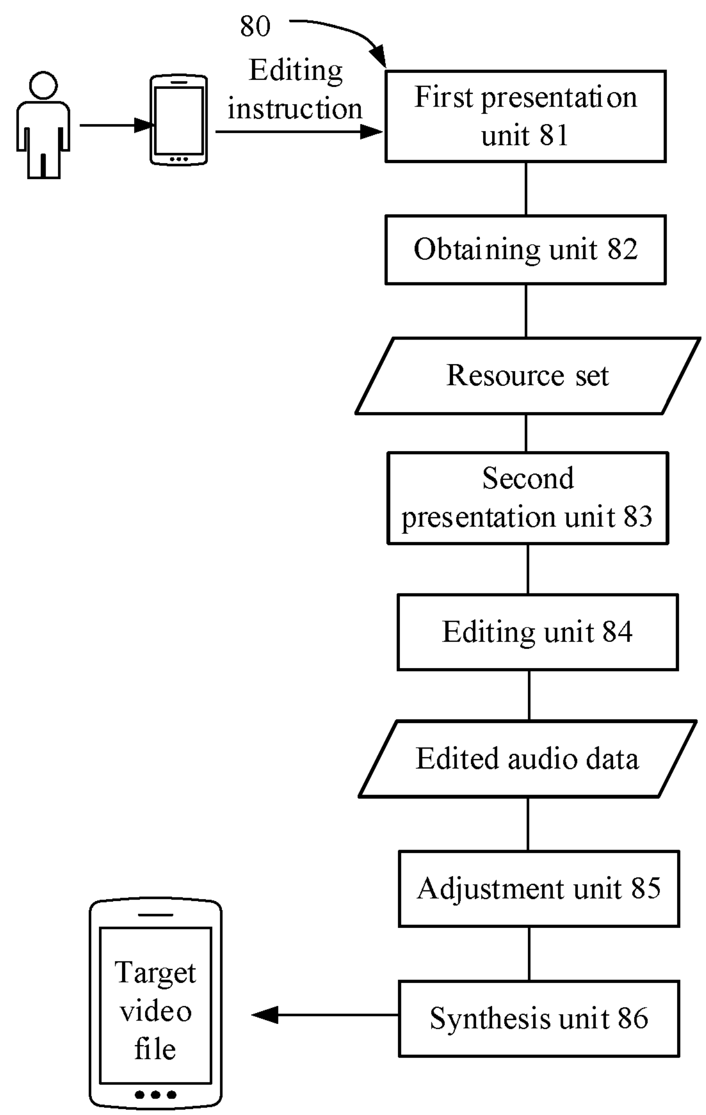
FIG. 8 is a schematic diagram showing a composition and a structure of an apparatus for generating a video file according to an embodiment of the present disclosure.

In the following, a software implementation of an apparatus for generating a video file according to an embodiment of the present disclosure is described. FIG. 8 is a schematic diagram of a composition and structure of an apparatus for generating a video file according to an embodiment of the present disclosure. Referring to FIG. 8, an apparatus 80 for generating a video file according to an embodiment of the present disclosure includes a first presentation unit 81, an obtaining unit 82, a second presentation unit 83, an editing unit 84, an adjustment unit 85, and a synthesis unit 86.

The first presentation unit 81 is configured to receive an editing instruction for a video, and present at least one video template corresponding to the video.

The obtaining unit 82 is configured to obtain, in response to a selection instruction for a target video template, a resource set corresponding to the target video template, the resource set including audio data, image data, and a video configuration parameter.

The second presentation unit 83 is configured to present an editing interface including an editing button if it is determined based on the video configuration parameter that the audio data is editable.

The edition unit 84 is configured to edit, in response to a clicking operation on the editing button, the audio data to obtain edited audio data.

The adjustment unit 85 is configured to adjust, based on the edited audio data, a playback parameter of the image data.

The synthesis unit 86 is configured to perform, based on the edited audio data and the adjusted playback parameter, video file synthesis to obtain a target video file.

In some embodiments, the edition unit is further configured to present, in response to the clicking operation on the editing button, multiple audio icons on the editing interface;

obtain, in response to a selection instruction for a target audio icon, target audio data corresponding to the target audio icon; and replace the audio data in the resource set with the target audio data.

In some embodiments, the edition unit is further configured to obtain a playback timeline of the audio data in the resource set, where the playback timeline indicates at least a start time instant and an end time instant of audio playback;

adjust a playback timeline of the target audio data based on the playback timeline; and replace the audio data in the resource set with the target audio data having the adjusted playback timeline.

In some embodiments, the apparatus further includes a cutting unit configured to:

present, in response to a clicking operation on a presented cutting button, a sound spectrum line corresponding to the target audio data;

determine, in response to a dragging operation on the sound spectrum line, a playback start time instant and/or a playback end time instant of the target audio data; and cut the target audio data based on the determined playback start time instant and/or the determined playback end time instant.

In some embodiments, the edition unit is further configured to present, in response to the clicking operation on the editing button, a volume adjustment axis for adjusting a playback volume of the audio data;

adjust, in response to a dragging operation on an adjustment node in the volume adjustment axis, a volume of the audio data at a playback position; and replace the audio data in the resource set with the audio data having the adjusted volume.

In some embodiments, the adjustment unit is further configured to obtain an image presentation mode corresponding to the target video template; and adjust, based on the image presentation mode and the edited audio data, at least one of following parameters of the image data: the number of images and a playback speed.

In some embodiments, the synthesis unit is further configured to obtain an image for forming the target video file based on the adjusted playback parameter;

obtain an image presentation mode corresponding to the target video template; and perform, based on the edited audio data, the obtained image and the image presentation mode, video encoding to obtain the target video file.

A terminal is provided according to an embodiment of the present disclosure. The terminal includes a memory and a processor.

The memory is configured to store executable instructions.

The processor is configured to implement the method for generating a video file according to the embodiments of the present disclosure when executing the executable instructions.

A non-transitory storage medium storing executable instructions is provided according to an embodiment of the present disclosure. The executable instructions are configured to perform, when executed, the method for generating a video file according to the embodiments of the present disclosure.

A method for generating a video file is provided according to one or more embodiments of the present disclosure. The method includes:

receiving an editing instruction for a video, and presenting at least one video template corresponding to the video;

obtaining, in response to a selection instruction for a target video template, a resource set corresponding to the target video template, the resource set including audio data, image data, and a video configuration parameter;

presenting an editing interface including an editing button if it is determined based on the video configuration parameter that the audio data is editable;

editing, in response to a clicking operation on the editing button, the audio data to obtain edited audio data;

adjusting, based on the edited audio data, a playback parameter of the image data; and performing, based on the edited audio data and the adjusted playback parameter, video file synthesis to obtain a target video file.

In some embodiments, the editing, in response to the clicking operation on the editing button, the audio data to obtain edited audio data includes:

presenting, in response to the clicking operation on the editing button, multiple audio icons on the editing interface;

obtaining, in response to a selection instruction for a target audio icon, target audio data corresponding to the target audio icon; and replacing the audio data in the resource set with the target audio data.

In some embodiments, the replacing the audio data in the resource set with the target audio data includes:

obtaining a playback timeline of the audio data in the resource set, where the playback timeline indicates at least a start time instant and an end time instant of audio playback;

adjusting a playback timeline of the target audio data based on the playback timeline; and replacing the audio data in the resource set with the target audio data having the adjusted playback timeline.

In some embodiments, the method further includes:

presenting, in response to a clicking operation on a presented cutting button, a sound spectrum line corresponding to the target audio data;

determining, in response to a dragging operation on the sound spectrum line, a playback start time instant and/or a playback end time instant of the target audio data; and cutting the target audio data based on the determined playback start time instant and/or the determined playback end time instant.

In some embodiments, the editing, in response to the clicking operation on the editing button, the audio data to obtain the edited audio data includes:

presenting, in response to the clicking operation on the editing button, a volume adjustment axis for adjusting a playback volume of the audio data;

adjusting, in response to a dragging operation on an adjustment node in the volume adjustment axis, a volume of the audio data at a playback position; and replacing the audio data in the resource set with the audio data having the adjusted volume.

In some embodiments, the adjusting, based on the edited audio data, the playback parameter of the image data includes:

obtaining an image presentation mode corresponding to the target video template; and adjusting, based on the image presentation mode and the edited audio data, at least one of following parameters of the image data: the number of images and a playback speed.

In some embodiments, the performing, based on the edited audio data and the adjusted playback parameter, video file synthesis to obtain the target video file includes:

obtaining an image for forming the target video file based on the adjusted playback parameter;

obtaining an image presentation mode corresponding to the target video template; and performing, based on the edited audio data, the obtained image and the image presentation mode, video encoding to obtain the target video file.

An apparatus for generating a video file is provided according to the embodiments of the present disclosure. The apparatus includes:

a first presentation unit, configured to receive an editing instruction for a video, and present at least one video template corresponding to the video;

an obtaining unit, configured to obtain, in response to a selection instruction for a target video template, a resource set corresponding to the target video template, the resource set including audio data, image data, and a video configuration parameter;

a second presentation unit, configured to present an editing interface including an editing button if it is determined based on the video configuration parameter that the audio data is editable;

an edition unit, configured to edit, in response to a clicking operation on the editing button, the audio data to obtain edited audio data;

an adjustment unit, configured to adjust, based on the edited audio data, a playback parameter of the image data; and a synthesis unit, configured to perform, based on the edited audio data and the adjusted playback parameter, video file synthesis to obtain a target video file.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. A method for generating a video file, comprising:

receiving an editing instruction for a video, and presenting at least one video template corresponding to the video;

obtaining, in response to a selection instruction for a target video template, a resource set corresponding to the target video template, the resource set comprising audio data, image data, and a video configuration parameter;

presenting an editing interface comprising an editing button in response to determining that the audio data is editable based on the video configuration parameter;

editing, in response to a clicking operation on the editing button, the audio data to obtain edited audio data, wherein the editing, in response to the clicking operation on the editing button, the audio data to obtain edited audio data further comprises:

presenting, in response to the clicking operation on the editing button, a plurality of audio icons on the editing interface, obtaining, in response to a selection instruction for a target audio icon, target audio data corresponding to the target audio icon, presenting, in response to a clicking operation on a presented cutting button, a sound spectrum line corresponding to the target audio data, determining, in response to a dragging operation on the sound spectrum line, at least one of a playback start time instant or a playback end time instant of the target audio data, and cutting the target audio data based on the determined at least one of the playback start time instant or the playback end time instant;

adjusting, based on the edited audio data, a playback parameter of the image data; and performing, based on the edited audio data and the adjusted playback parameter, video file synthesis to obtain a target video file.

2. The method according to claim 1, wherein the editing, in response to the clicking operation on the editing button, the audio data to obtain edited audio data comprises:

replacing the audio data in the resource set with the target audio data.

3. The method according to claim 2, wherein the replacing the audio data in the resource set with the target audio data comprises:

obtaining a playback timeline of the audio data in the resource set, wherein the playback timeline indicates at least a start time instant and an end time instant of audio playback;

adjusting a playback timeline of the target audio data based on the playback timeline; and replacing the audio data in the resource set with the target audio data having the adjusted playback timeline.

4. The method according to claim 1, wherein the editing, in response to the clicking operation on the editing button, the audio data to obtain the edited audio data comprises:

presenting, in response to the clicking operation on the editing button, a volume adjustment axis for adjusting a playback volume of the audio data;

adjusting, in response to a dragging operation on an adjustment node in the volume adjustment axis, a volume of the audio data at a playback position; and replacing the audio data in the resource set with the audio data having the adjusted volume.

5. The method of claim 1, wherein the adjusting, based on the edited audio data, the playback parameter of the image data comprises:

obtaining an image presentation mode corresponding to the target video template; and adjusting, based on the image presentation mode and the edited audio data, at least one of following parameters of the image data: the number of images and a playback speed.

6. The method of claim 1, wherein the performing, based on the edited audio data and the adjusted playback parameter, video file synthesis to obtain the target video file comprises:

obtaining an image for forming the target video file based on the adjusted playback parameter;

obtaining an image presentation mode corresponding to the target video template; and performing, based on the edited audio data, the obtained image and the image presentation mode, video encoding to obtain the target video file.

7. An apparatus for generating a video file, comprising:

a memory, configured to store executable instructions; and a processor, when executing the executable instructions, configured to implement operations comprising:

receiving an editing instruction for a video, and present at least one video template corresponding to the video;

obtaining, in response to a selection instruction for a target video template, a resource set corresponding to the target video template, the resource set comprising audio data, image data, and a video configuration parameter;

presenting an editing interface comprising an editing button in response to determining that the audio data is editable based on the video configuration parameter;

editing, in response to a clicking operation on the editing button, the audio data to obtain edited audio data, wherein the editing, in response to the clicking operation on the editing button, the audio data to obtain edited audio data further comprises:

presenting, in response to the clicking operation on the editing button, a plurality of audio icons on the editing interface, obtaining, in response to a selection instruction for a target audio icon, target audio data corresponding to the target audio icon, presenting, in response to a clicking operation on a presented cutting button, a sound spectrum line corresponding to the target audio data, determining, in response to a dragging operation on the sound spectrum line, at least one of a playback start time instant or a playback end time instant of the target audio data, and cutting the target audio data based on the determined at least one of the playback start time instant or the playback end time instant;

adjusting, based on the edited audio data, a playback parameter of the image data; and performing, based on the edited audio data and the adjusted playback parameter, video file synthesis to obtain a target video file.

8. The apparatus according to claim 7, wherein the processor, when executing the executable instructions, configured to implement the operations comprising:

replacing the audio data in the resource set with the target audio data.

9. The apparatus according to claim 8, wherein the processor, when executing the executable instructions, configured to implement the operations comprising:

obtaining a playback timeline of the audio data in the resource set, wherein the playback timeline indicates at least a start time instant and an end time instant of audio playback;

adjusting a playback timeline of the target audio data based on the playback timeline; and replacing the audio data in the resource set with the target audio data having the adjusted playback timeline.

10. The apparatus according to claim 7, wherein the processor, when executing the executable instructions, configured to implement the operations comprising:

presenting, in response to the clicking operation on the editing button, a volume adjustment axis for adjusting a playback volume of the audio data;

adjusting, in response to a dragging operation on an adjustment node in the volume adjustment axis, a volume of the audio data at a playback position; and replacing the audio data in the resource set with the audio data having the adjusted volume.

11. The apparatus of claim 7, wherein the processor, when executing the executable instructions, configured to implement the operations comprising:

obtaining an image presentation mode corresponding to the target video template; and adjusting, based on the image presentation mode and the edited audio data, at least one of following parameters of the image data: the number of images and a playback speed.

12. The apparatus of claim 7, wherein the processor, when executing the executable instructions, configured to implement the operations comprising:

obtaining an image for forming the target video file based on the adjusted playback parameter;

obtaining an image presentation mode corresponding to the target video template; and performing, based on the edited audio data, the obtained image and the image presentation mode, video encoding to obtain the target video file.

13. A non-transitory storage medium, storing executable instructions configured to perform, when executed, operations comprising:

receiving an editing instruction for a video, and presenting at least one video template corresponding to the video;

obtaining, in response to a selection instruction for a target video template, a resource set corresponding to the target video template, the resource set comprising audio data, image data, and a video configuration parameter;

presenting an editing interface comprising an editing button in response to determining that the audio data is editable based on the video configuration parameter;

editing, in response to a clicking operation on the editing button, the audio data to obtain edited audio data, wherein the editing, in response to the clicking operation on the editing button, the audio data to obtain edited audio data further comprises:

presenting, in response to the clicking operation on the editing button, a plurality of audio icons on the editing interface, obtaining, in response to a selection instruction for a target audio icon, target audio data corresponding to the target audio icon, presenting, in response to a clicking operation on a presented cutting button, a sound spectrum line corresponding to the target audio data, determining, in response to a dragging operation on the sound spectrum line, at least one of a playback start time instant or a playback end time instant of the target audio data, and cutting the target audio data based on the determined at least one of the playback start time instant or the playback end time instant;

adjusting, based on the edited audio data, a playback parameter of the image data; and performing, based on the edited audio data and the adjusted playback parameter, video file synthesis to obtain a target video file.

14. The non-transitory storage medium of claim 13, the operations further comprising:

replacing the audio data in the resource set with the target audio data.

15. The non-transitory storage medium of claim 14, wherein the replacing the audio data in the resource set with the target audio data further comprises:

obtaining a playback timeline of the audio data in the resource set, wherein the playback timeline indicates at least a start time instant and an end time instant of audio playback;

adjusting a playback timeline of the target audio data based on the playback timeline; and replacing the audio data in the resource set with the target audio data having the adjusted playback timeline.

16. The non-transitory storage medium of claim 13, wherein the editing, in response to the clicking operation on the editing button, the audio data to obtain the edited audio data comprises:

presenting, in response to the clicking operation on the editing button, a volume adjustment axis for adjusting a playback volume of the audio data;

adjusting, in response to a dragging operation on an adjustment node in the volume adjustment axis, a volume of the audio data at a playback position; and replacing the audio data in the resource set with the audio data having the adjusted volume.

17. The non-transitory storage medium of claim 13, wherein the adjusting, based on the edited audio data, the playback parameter of the image data comprises:

obtaining an image presentation mode corresponding to the target video template; and adjusting, based on the image presentation mode and the edited audio data, at least one of following parameters of the image data: the number of images and a playback speed.

18. The non-transitory storage medium of claim 13, wherein the performing, based on the edited audio data and the adjusted playback parameter, video file synthesis to obtain the target video file comprises:

obtaining an image for forming the target video file based on the adjusted playback parameter;

obtaining an image presentation mode corresponding to the target video template; and performing, based on the edited audio data, the obtained image and the image presentation mode, video encoding to obtain the target video file.

* * * * *